(12) United States Patent
Miller (10) Patent No.: US 9,555,899 B2
(45) Date of Patent: Jan. 31, 2017

(54) MOBILE ARRESTING SYSTEM

(71) Applicant: The United States of America as represented by the Secretary of the Navy, Washington, DC (US)

(72) Inventor: Gerald Miller, Bedford, IN (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 76 days.

(21) Appl. No.: 14/227,007

(22) Filed: Mar. 27, 2014

(65) Prior Publication Data

US 2015/0274321 A1    Oct. 1, 2015

(51) Int. Cl.
*B64F 1/02*     (2006.01)
*B66C 23/18*    (2006.01)
*B64C 39/02*    (2006.01)

(52) U.S. Cl.
CPC .............. *B64F 1/02* (2013.01); *B64C 39/024* (2013.01); *B64C 2201/182* (2013.01); *B66C 23/18* (2013.01)

(58) Field of Classification Search
CPC .............. B64F 1/02; B64F 1/025; B64F 1/04; B64F 3/00; B64C 2201/182; B64C 1/22; B66C 1/0287; B66C 1/12; B66C 23/02; B66C 23/16; B66C 23/18; B66C 23/66; B66C 700/082
See application file for complete search history.

(56) References Cited

U.S. PATENT DOCUMENTS

| | | | | |
|---|---|---|---|---|
| 1,748,663 | A * | 2/1930 | Tucker | B64F 1/04 244/110 F |
| 1,842,432 | A * | 1/1932 | Stanton | B64F 1/04 244/110 F |
| 4,311,290 | A * | 1/1982 | Koper | B64F 1/02 244/110 R |
| 5,603,239 | A * | 2/1997 | Chong | B66C 23/74 212/195 |
| 5,655,412 | A * | 8/1997 | Luik | B23K 20/123 74/490.01 |
| 6,023,061 | A * | 2/2000 | Bodkin | B64D 47/08 250/252.1 |
| 6,264,140 | B1 * | 7/2001 | McGeer | B64C 25/68 244/110 C |
| 7,530,527 | B2 * | 5/2009 | Kelleher | B64C 37/02 244/2 |
| 8,028,952 | B2 * | 10/2011 | Urnes, Sr. | B63B 35/50 114/261 |
| 2004/0213587 | A1 * | 10/2004 | Conchas | H04B 10/1123 398/212 |

(Continued)

*Primary Examiner* — Joseph W Sanderson
*Assistant Examiner* — Christopher Hutchens
(74) *Attorney, Agent, or Firm* — Christopher A. Monsey (57) ABSTRACT

A system for arresting an unmanned aerial vehicle (UAV). In an illustrative embodiment, a crane has an arrestment receiver that can pivot around the crane. A UAV has a hook on one of its wings that can latch onto the arrestment receiver during flight. After latching onto the arrestment receiver, the UAV pivots around the end of the crane until the UAV comes to rest. The UAV and the arrestment receiver each include optical alignment systems that facilitate the connection between the hook and the arrestment receiver.

7 Claims, 11 Drawing Sheets

(56) References Cited

U.S. PATENT DOCUMENTS

| | | | |
|---|---|---|---|
| 2006/0249623 A1* | 11/2006 | Steele | B64F 1/02 244/116 |
| 2008/0017601 A1* | 1/2008 | Neupert et al. | B66C 13/06 212/274 |
| 2009/0084927 A1* | 4/2009 | Nihei | B25J 19/005 248/674 |
| 2009/0242693 A1* | 10/2009 | Urnes, Sr. | B63B 35/50 244/63 |
| 2009/0294584 A1* | 12/2009 | Lovell | B63B 27/10 244/110 F |
| 2010/0012765 A1* | 1/2010 | Solenne | F41G 7/303 244/3.16 |
| 2013/0320138 A1* | 12/2013 | Dickson | B64F 1/02 244/110 F |
| 2014/0379173 A1* | 12/2014 | Knapp | G06Q 10/10 701/2 |

* cited by examiner

MOBILE ARRESTING SYSTEM

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention relates to a system for arresting an unmanned aerial vehicle (UAV). In existing systems, in order for a UAV to land, there needed to be a runway long enough for the UAV to touch down and decelerate to a complete stop. This was a problem when the UAV needed to land somewhere where space is limited, such as on an aircraft carrier.

One aspect or embodiment of the present invention addresses this issue by providing a system for arresting an unmanned aerial vehicle that does not include a runway and that has a relatively small footprint when compared to the size of a runway.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
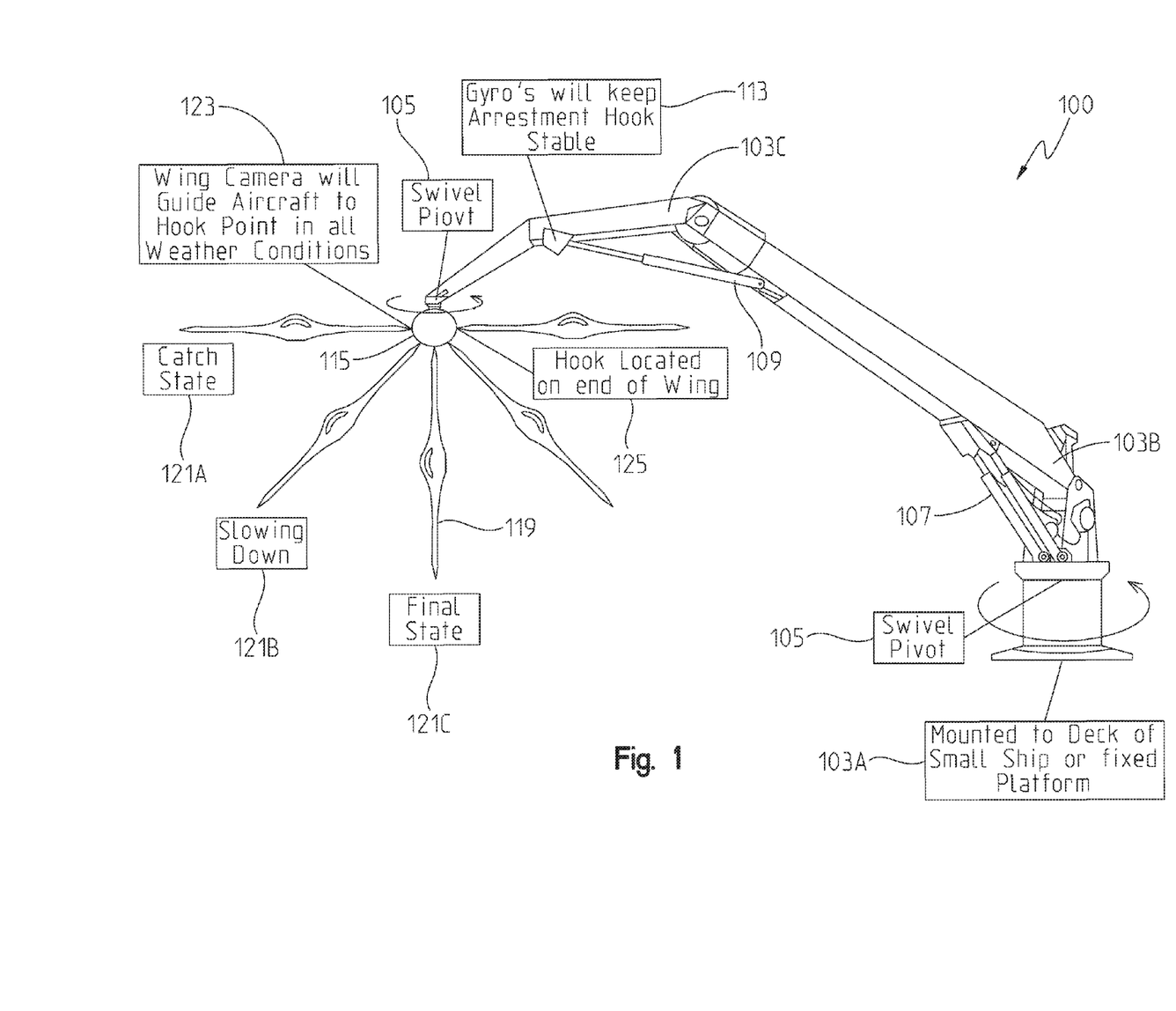
FIG. 1 shows a diagram of a mobile arresting system for arresting a UAV according to an illustrative embodiment of the invention.

Referring initially to FIG. 1, a diagram of a mobile arresting system 100 for arresting a UAV according to an illustrative embodiment of the invention is shown. The mobile arresting system 100 includes a crane comprising a crane base 103A, a lower crane section 103B, and an upper crane section 103C. The mobile arresting system 100 further includes swivel pivots 105, a first hydraulic bracket 107, a second hydraulic bracket 109, gyroscopes 113, an arrestment receiver 115, and a UAV 119 in a catch state 121A, slowing state 121B, and final state 121C. The UAV 119 includes a wing camera 123 and an arrestment hook 125.

In operation, the crane base 103A is mounted to the deck of a ship or to a platform. The lower crane section 103B is attached at one end to the crane base 103A on a swivel pivot 105, such that the lower crane section 103B rotates around the crane base 103A. The first hydraulic bracket 107 is connected between the crane base 103A and the lower crane section 103B and is used to adjust the height and angle of the lower crane section 103B. The upper crane section 103C is attached to the lower crane section 103B. The second hydraulic bracket 109 is connected between the upper crane section 103C and the lower crane section 103B and is used to adjust the height and angle of the upper crane section 103C. The arrestment receiver 115 is attached to the end of the upper crane section 103C on a swivel pivot 105, such that the arrestment receiver 115 rotates around the end of the upper crane section 103C. The wing camera 123 locates the position of the arrestment receiver 115 and sends data to the autopilot system of the UAV 119, and the UAV 119 positions itself such that the arrestment hook 125 latches onto the arrestment receiver 115. At this point, the arrestment hook 125 is attached to the arrestment receiver 115, and the UAV 119 is in the catch state 121A where the UAV 119 is substantially horizontal. The momentum of the UAV 119 causes the UAV 119 and the arrestment receiver 115 to spin around the pivot point 105 at the end of the upper crane section 103C. As the UAV 119 slows down, the UAV 119 starts to angle downwards and is in the slowing state 121B. Gyroscopes 113 in the second hydraulic bracket 109 and at the joint of the upper crane section 103C and lower crane section 103B stabilize the arrestment hook 125 while the UAV 119 is being arrested. The UAV 119 comes to a stop and hangs vertically in the final state 121C.

In another embodiment, after the arrestment hook 125 is attached to the arrestment receiver 115, the crane rotates around the pivot point 105 at the crane base 103A in order to counter the rotational inertia of the UAV 119.

Figure 2:
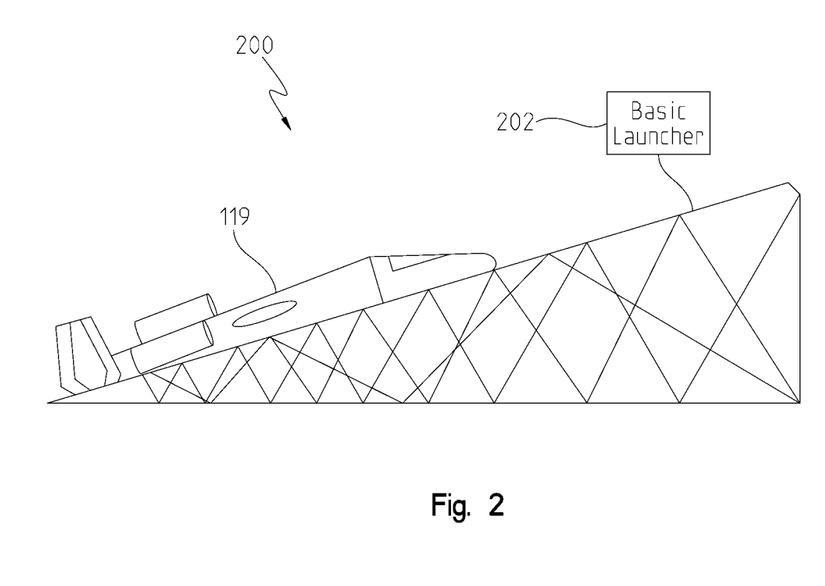
FIG. 2 shows a diagram of a launching system for a UAV according to an illustrative embodiment of the invention.

Referring to FIG. 2, a diagram of a launching system 200 for a UAV according to an illustrative embodiment of the invention is shown. The launching system includes a UAV 119 and a launching ramp 202. In operation, once the UAV 119 has been arrested (see FIG. 1), the crane pivots around the swivel pivot 105 at the crane base 103A such that the UAV 119 is moved over the launching ramp 202. The UAV 119 is placed at the base of the launching ramp 202 and is propelled up the launching ramp 202 until the UAV 119 is launched into flight.

Figure 3:
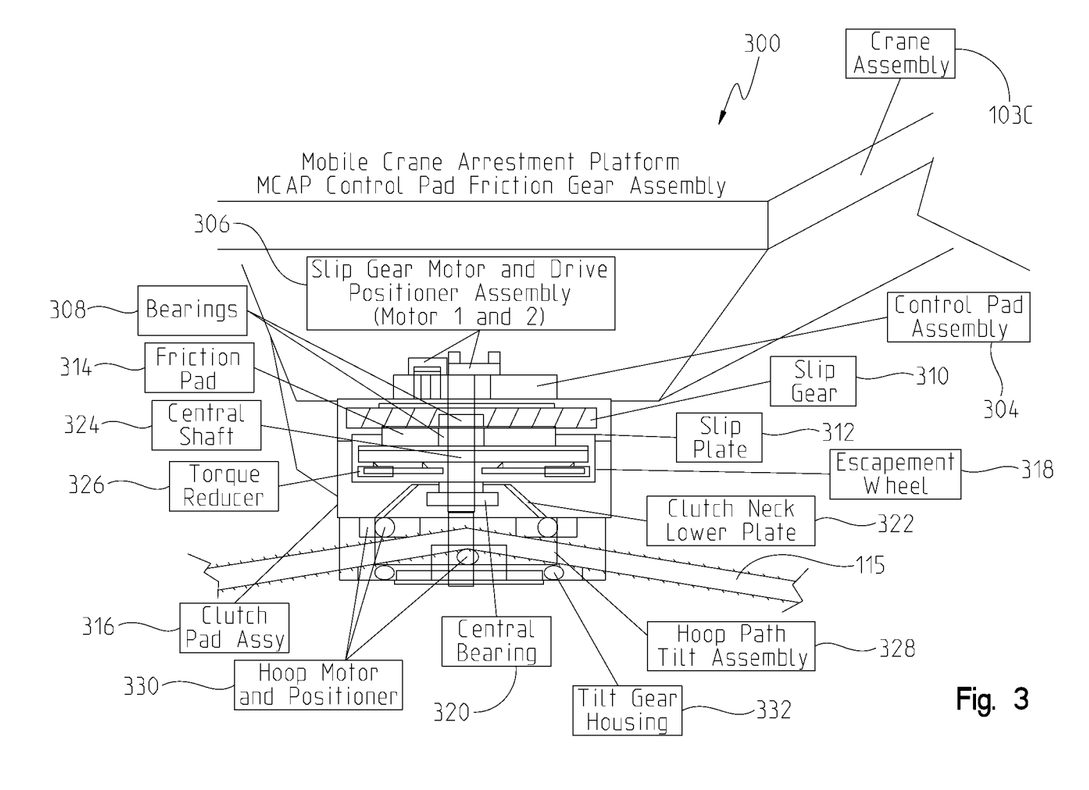
FIG. 3 shows a diagram of an arrestment receiver control assembly according to an illustrative embodiment of the invention.

Referring to FIG. 3, a diagram of an arrestment receiver control assembly 300 according to an illustrative embodiment of the invention is shown. The arrestment receiver control assembly 300 includes a control pad assembly 304, a slip gear motor and drive positioner assembly 306, bearings 308, a slip gear 310, a slip plate 312, a friction pad 314, a clutch pad assembly 316, an escapement wheel 318, central bearings 320, a clutch neck lower plate 322, a central shaft 324, a torque reducer 326, a hoop path tilt assembly 328, a hoop motor and positioner 330, and a tilt gear housing 332.

In operation, the arrestment receiver control assembly 300 is attached to the upper crane section 103C (e.g., see FIG. 1). The arrestment receiver 115 is attached to the arrestment receiver control assembly 300. The arrestment receiver control assembly positions the arrestment receiver 115 prior to receiving the arrestment hook 125 of the UAV 119. The hoop path tilt assembly 328 adjusts the tilt of the arrestment receiver 115. The control pad assembly 304 rotates the arrestment receiver 115. The slip gear motor and drive positioner assembly 306 rotates the central shaft 324, which in turn rotates the arrestment receiver 115. The slip gear 310, control pad assembly 304, friction pad 314, and tilt gear housing 332 all rotate with the central shaft 324 while the clutch pad assembly 316 remains stationary. Once the arrestment hook 125 of the UAV 119 is attached to the arrestment receiver 115 (see FIG. 1), the weight of the UAV 119 adds a downward force on the friction pad 314 that aids in slowing down the UAV 119 to a complete stop in the final state 121C.

Figure 4:
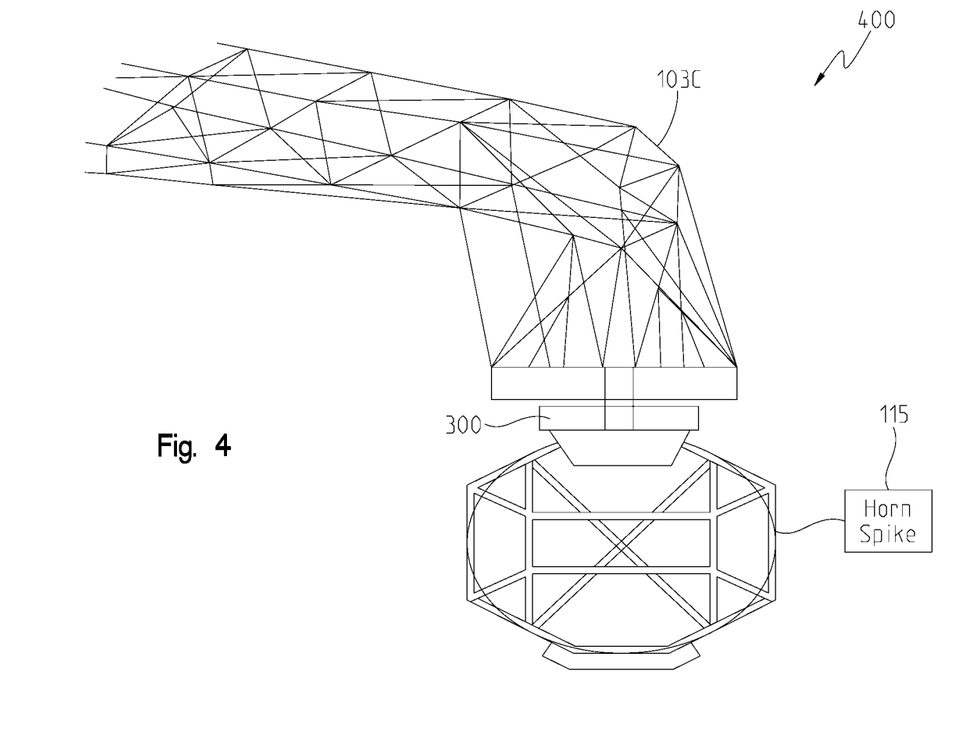
FIG. 4 shows a diagram of a mobile arresting system for arresting a UAV according to an illustrative embodiment of the invention.

Referring to FIG. 4, a diagram of a mobile arresting system 400 for arresting a UAV according to an illustrative embodiment of the invention is shown. The mobile arresting system 400 includes a crane assembly, an arrestment receiver control assembly 300, and an arrestment receiver 115. In operation, the arrestment receiver 115 is attached to the arrestment receiver control assembly 300 (see FIG. 3), and the arrestment receiver control assembly 300 is attached to the upper crane section 103C of the crane assembly (see FIG. 1). The arrestment receiver control assembly 300 rotates and tilts the arrestment receiver 115 (see FIG. 3).

Figure 5:
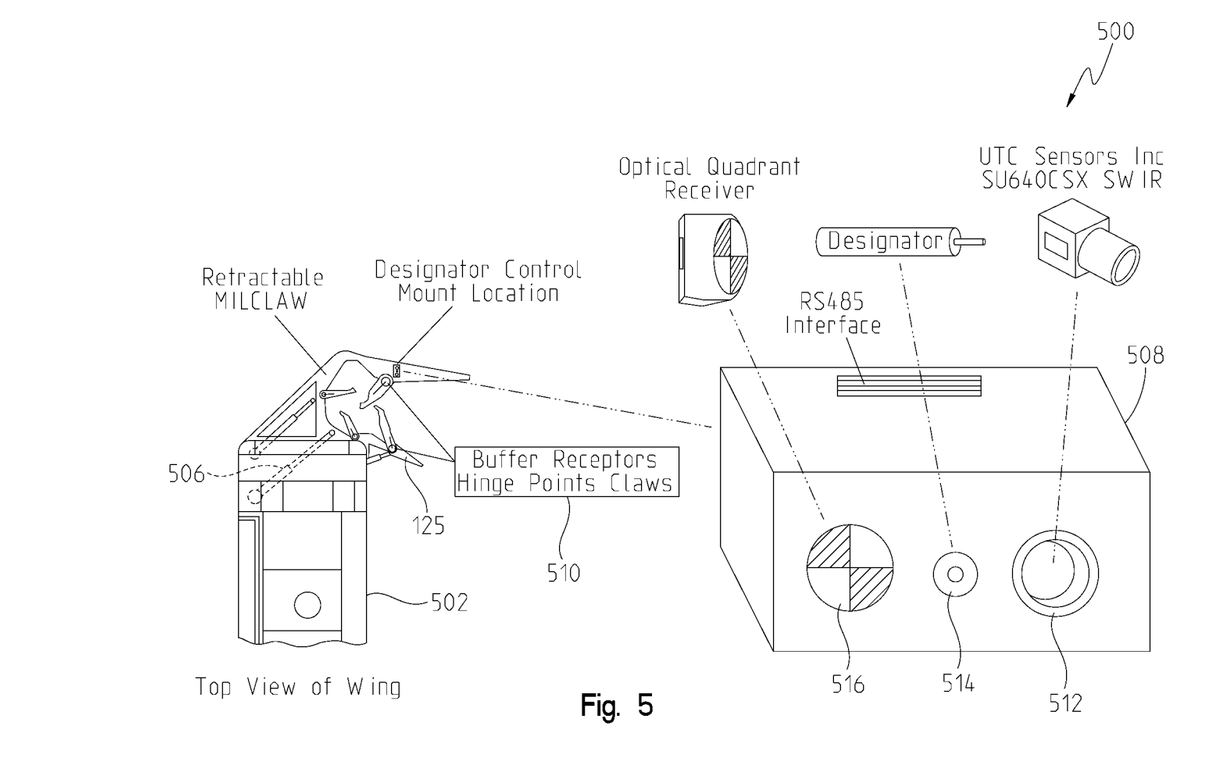
FIG. 5 shows a diagram of a UAV alignment system according to an illustrative embodiment of the invention.

Referring to FIG. 5, a diagram of a UAV alignment system 500 according to an illustrative embodiment of the invention is shown. The UAV alignment system 500 includes a wing 502 of the UAV 119, an arrestment hook 125, a retractable mounting bracket 506, and a camera assembly 508. The arrestment hook 125 includes buffer receptors 510. The camera assembly 508 includes an infrared camera 512, a designator 514, and an optical quadrant receiver 516.

In operation, the arrestment hook 125 is attached to the end of the wing 502. The retractable mounting bracket 506 allows the arrestment hook 125 to be retracted against the wing 502. The camera assembly 508 is mounted on the arrestment hook 125. The infrared camera 512 detects the arrestment receiver 115 and sends data to the autopilot system of the UAV 119 that directs the UAV 119 toward the arrestment receiver 115. The designator 514 emits an optical beam toward the arrestment receiver 115. The optical quadrant receiver 516 receives an optical beam that is emitted from an alignment system for the arrestment receiver (see FIG. 6). The optical quadrant receiver 516 determines the angle of the received optical beam and the autopilot system adjusts the elevation and azimuth of the UAV 119 so that the flight path of the UAV 119 results in the arrestment hook 125 colliding with the arrestment receiver 115. The arrestment receiver 115 collides with the buffer receptors 510. The buffer receptors 510 collapse inward allowing the arrestment receiver 115 to slide deeper into the arrestment hook 125. Once the arrestment receiver 115 is clear of the buffer receptors 510, the buffer receptors 510 snap back to their previous positions, locking the arrestment receiver 115 in the arrestment hook 125. In another embodiment, the camera assembly 508 is mounted on the wing 502 of the UAV 119.

Figure 6:
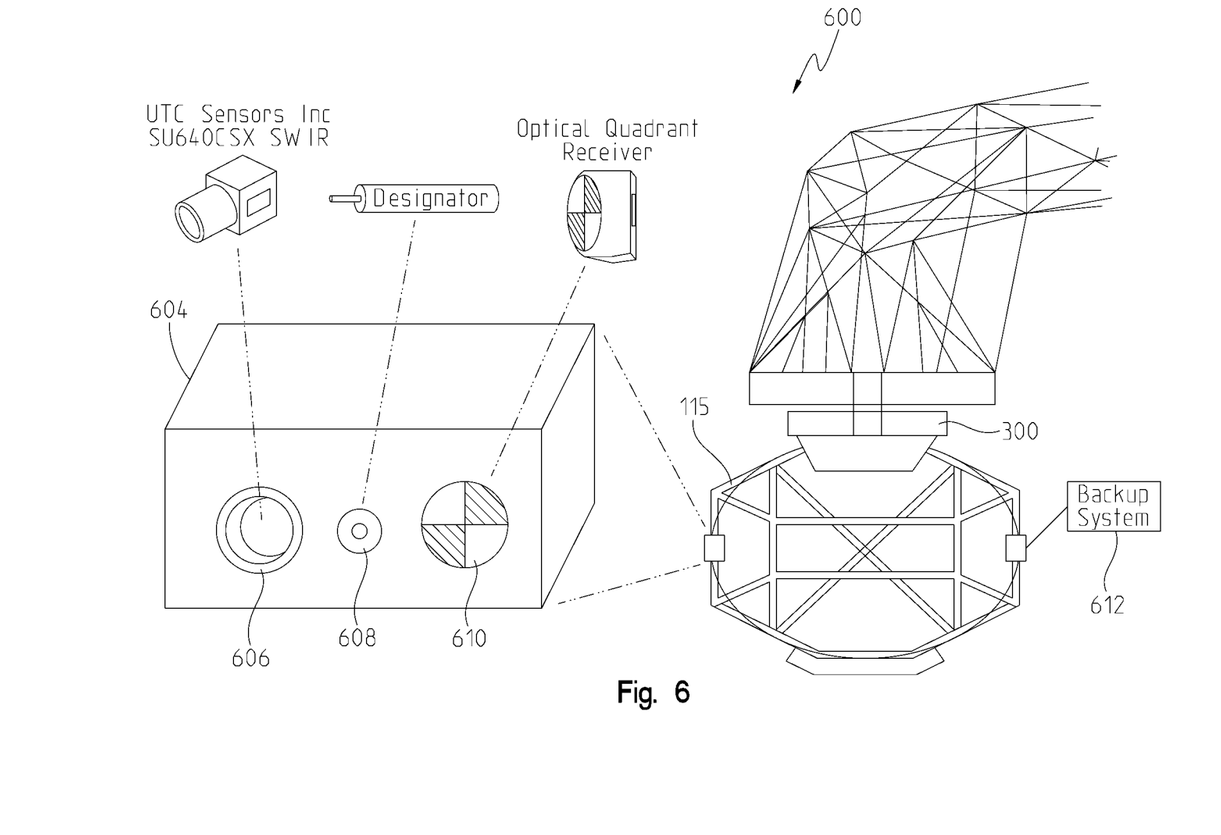
FIG. 6 shows a diagram of a receiver alignment system according to an illustrative embodiment of the invention.

Referring to FIG. 6, a diagram of a receiver alignment system 600 for an arrestment receiver according to an illustrative embodiment of the invention is shown. The receiver alignment system 600 includes an arrestment receiver 115, an arrestment receiver control assembly 300, and a camera assembly 604. The camera assembly 604 includes an infrared camera 606, a designator 608, and an optical quadrant receiver 610.

In operation, the arrestment receiver 115 is attached to the arrestment receiver control assembly 300 (see FIG. 3), and the camera assembly 604 is mounted on the arrestment receiver 115. The infrared camera 606 detects the UAV 119, and the arrestment receiver control assembly 300 rotates the arrestment receiver 115 so it is better positioned to receive the arrestment hook 125 of the UAV 119. The designator 608 emits an optical beam toward the UAV 119. The optical quadrant receiver 610 receives an optical beam that is emitted from an alignment system for the UAV (see FIG. 5). The optical quadrant receiver 610 determines the angle of the received optical beam and the arrestment receiver control assembly 300 adjusts the rotation and tilt of the arrestment receiver 115 (see FIG. 3) so that the flight path of the UAV 119 results in the arrestment hook 125 of the UAV 119 colliding with the arrestment receiver 115.

Figure 7:
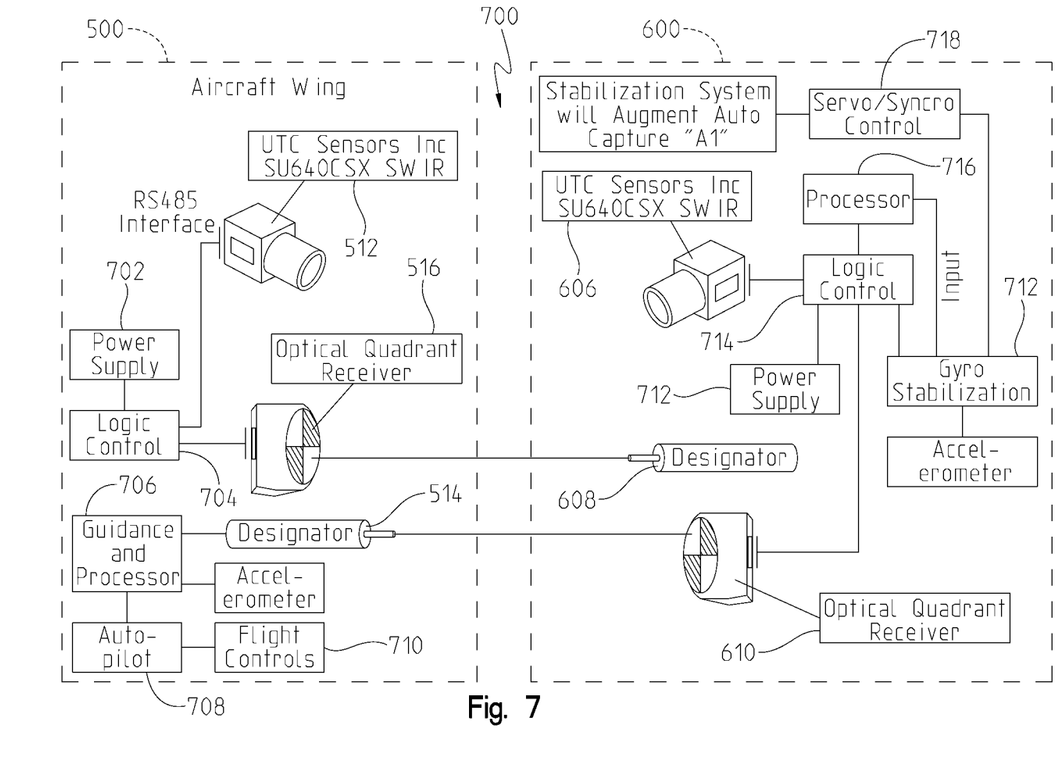
FIG. 7 shows a diagram of an alignment system according to an illustrative embodiment of the invention.

Referring to FIG. 7, a diagram of an alignment system 700 according to an illustrative embodiment of the invention is shown. The alignment system 700 includes a UAV alignment system 500 (see FIG. 5) and a receiver alignment system 600 (see FIG. 6).

In operation, the UAV alignment system 500 is powered by a UAV power supply 702. The UAV infrared camera 512 interfaces with a UAV logic control system 704 to detect the arrestment receiver 115 by comparing received images with images stored in a data storage that are associated with an approach profile. The UAV logic control system 704 communicates with a UAV guidance and processor system 706, which communicates with an autopilot system 708. The autopilot system 708 communicates with a flight control system 710 to adjust the position of the UAV 119. The UAV designator 514 is controlled by the UAV guidance and processor system and emits an optical beam. The UAV optical quadrant receiver 516 repeatedly receives optical input data and communicates with the UAV logic control system 704.

The receiver alignment system 600 is powered by a receiver power supply 712. The arrestment infrared camera 606 interfaces with an arrestment logic control system 714 to detect the UAV 119. An arrestment processor 716 communicates with the arrestment logic control system 714 to control a gyroscope stabilization system 712 and a servo motor control system 718. The servo motor control system 718 adjusts the rotation and tilt of the arrestment receiver (see FIG. 3). The arrestment designator 608 emits an optical beam, and the arrestment optical quadrant receiver 610 repeatedly receives optical input data and communicates with the arrestment logic control system 714.

The UAV optical quadrant receiver 516 receives an optical signal emitted by the arrestment designator 608 and communicates with the UAV logic control system 704, the UAV guidance and processor system 706, and the autopilot system 708 to position the UAV 119 such that the UAV optical quadrant receiver 516 is directly in line with the optical beam emitted by the arrestment designator 608. Similarly, the arrestment optical quadrant receiver 610 receives an optical signal emitted from the UAV designator 514. The arrestment optical quadrant receiver 610 communicates with the arrestment logic control system 714, the arrestment processor 716, and the servo motor control system 718 to position the arrestment receiver such that the arrestment optical quadrant receiver 610 is directly in line with the optical beam emitted by the UAV designator 608. When the two alignment systems are directly in line with each other, the flight path of the UAV 119 will result in the arrestment hook 125 latching onto the arrestment receiver 115.

Figure 8A:
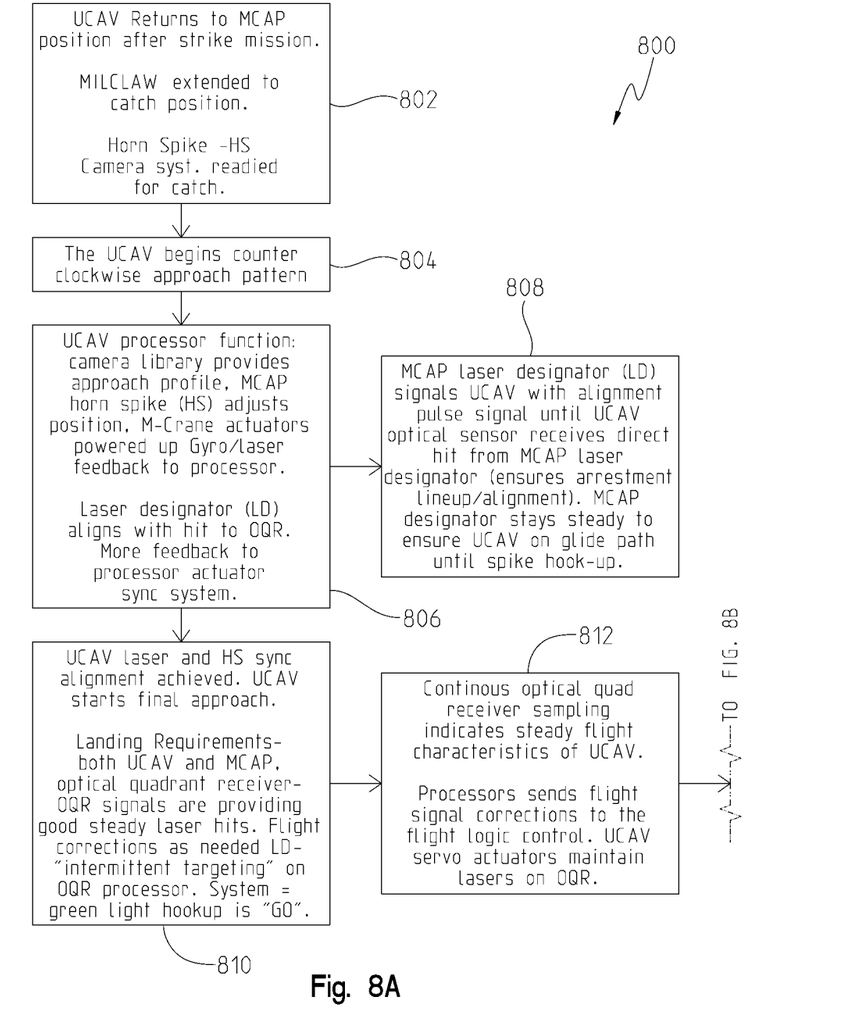
FIGS. 8a, 8b, and 8c show a flowchart of a process for arresting a UAV according to an illustrative embodiment of the invention.
Figure 8B:
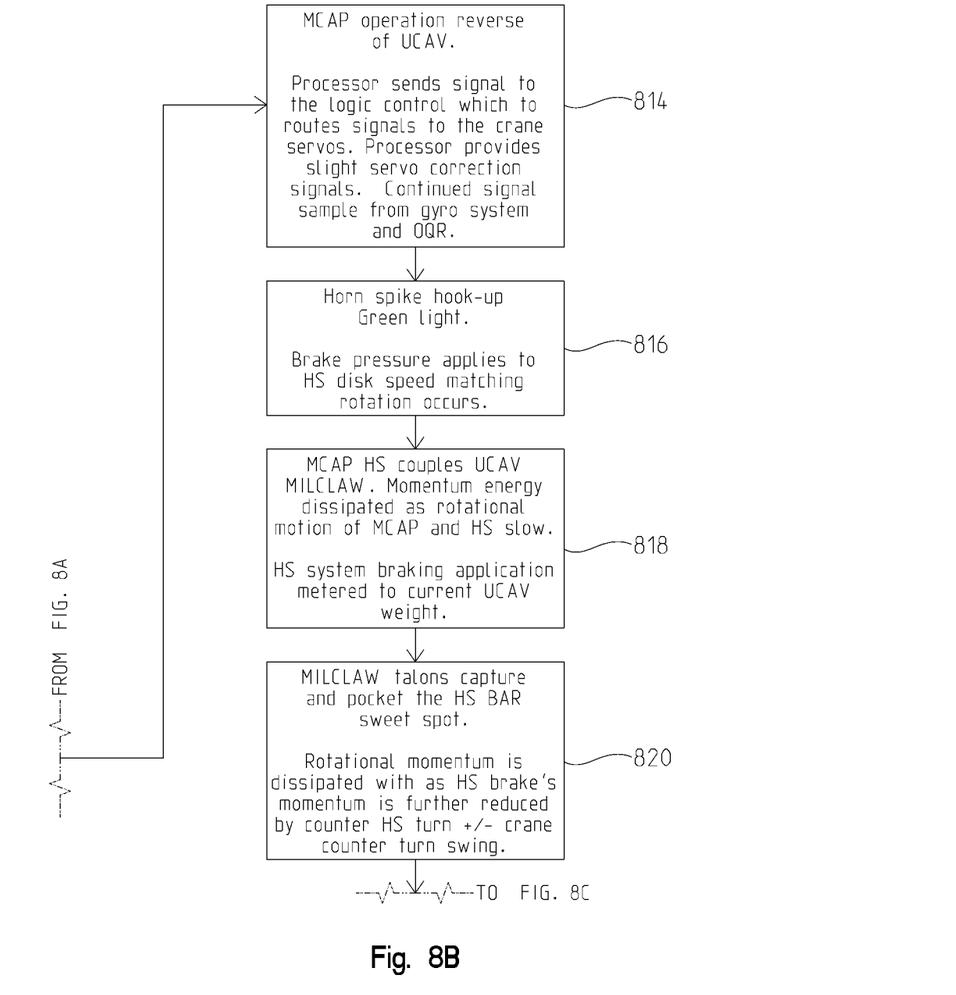
Figure 8C:
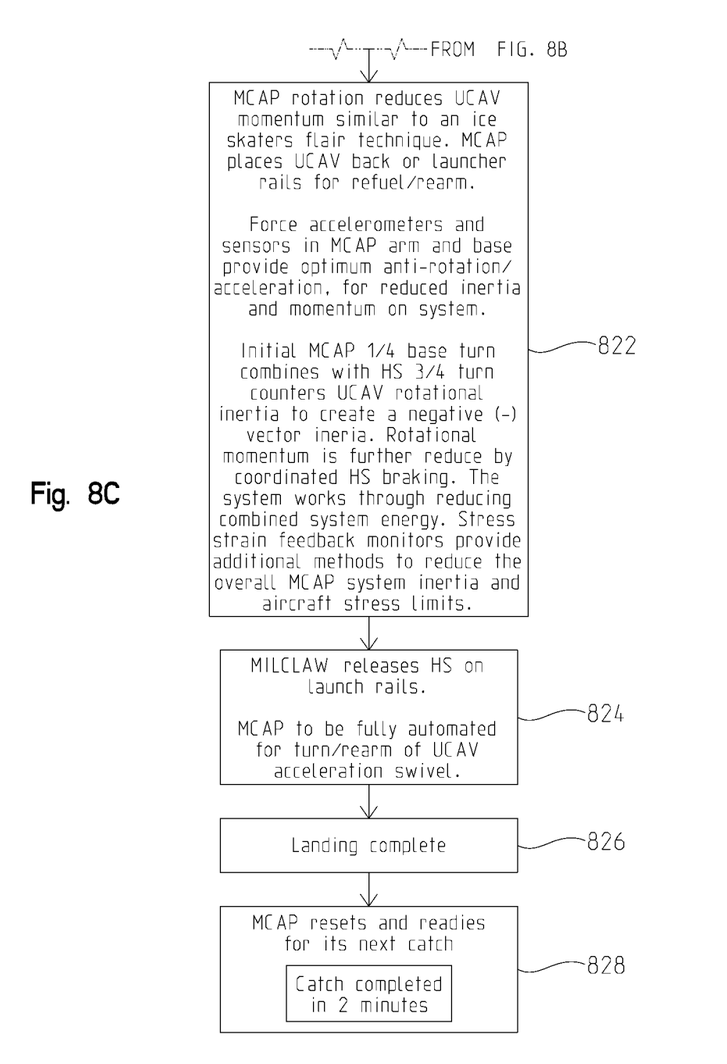

Referring to FIG. 8, a flowchart of a process 800 for arresting a UAV according to an illustrative embodiment of the invention is shown. At step 802, an unmanned combat air vehicle (UCAV) or UAV returns to the airspace near a mobile arresting system, which includes a pivoting crane and an arrestment receiver attached to the crane. The UAV extends its arrestment hook to a catch position, such that the arrestment hook can be attached to an arrestment receiver. The camera and alignment system on the arrestment receiver (horn spike or HS) are activated and readied for catching the UAV. At step 804, the UAV approaches the mobile arresting system in a counter-clockwise approach pattern. At step 806, a processor on the UAV accesses the UAV's camera library and provides an approach profile. The arrestment receiver adjusts its position, the mobile arresting system powers up its crane actuators, and the gyroscopes and laser designator systems provide feedback to the processor. The laser designator of the mobile arrestment system aligns with the optical quadrant receiver on the UAV. This is explained in more detail in step 808 where the laser designator of the mobile arrestment system pulses laser signals. The UAV adjusts its position until the optical quadrant receiver on the UAV receives direct hits from the laser signals, and the arrestment receiver stays steady so its laser designator does not move. At step 810, the UAV laser is in direct alignment with the optical quadrant receiver of the mobile arresting system, and the UAV begins its final approach. In order for this to occur, the optical quadrant receivers on both the UAV and the mobile arresting system must be receiving steady direct hits from the laser designators on the mobile arresting system and the UAV. At step 812, the sampling by the optical quad receivers indicates the UAV has achieved steady flight characteristics. At step 814, the mobile arresting system adjusts the position of the arrestment receiver in order to maintain alignment. At step 816, steady alignment of the systems allows for arrestment to begin. At step 818, the arrestment hook on the UAV couples with a rod on the arrestment receiver. The arrestment receiver with the UAV attached rotates around a pivot point, and a braking system slows the rotation of the arrestment receiver. At step 820, the arrestment hook has captured and pocketed the rod of the arrestment receiver. Both crane and the arrestment receiver rotate in order to counter the rotational inertia of the UAV. At step 822, force accelerometers and sensors in the mobile arrestment system determine the optimal rotational speed for reduced inertia and momentum on the UAV. This is achieved by pivoting the crane a quarter of a turn and pivoting the arrestment receiver three quarters of a turn while applying a braking force to the arrestment receiver. At step 824, the crane positions the UAV on the launch rails of a UAV launcher, and the arrestment hook releases the rod of the arrestment receiver. The UAV may be re-launched at this point. At step 826, the landing has completed. At step 828, the mobile arresting system returns the crane and the arrestment receiver to their original positions and prepares for the next catch. The entire process is completed in less than two minutes.

Figure 9:
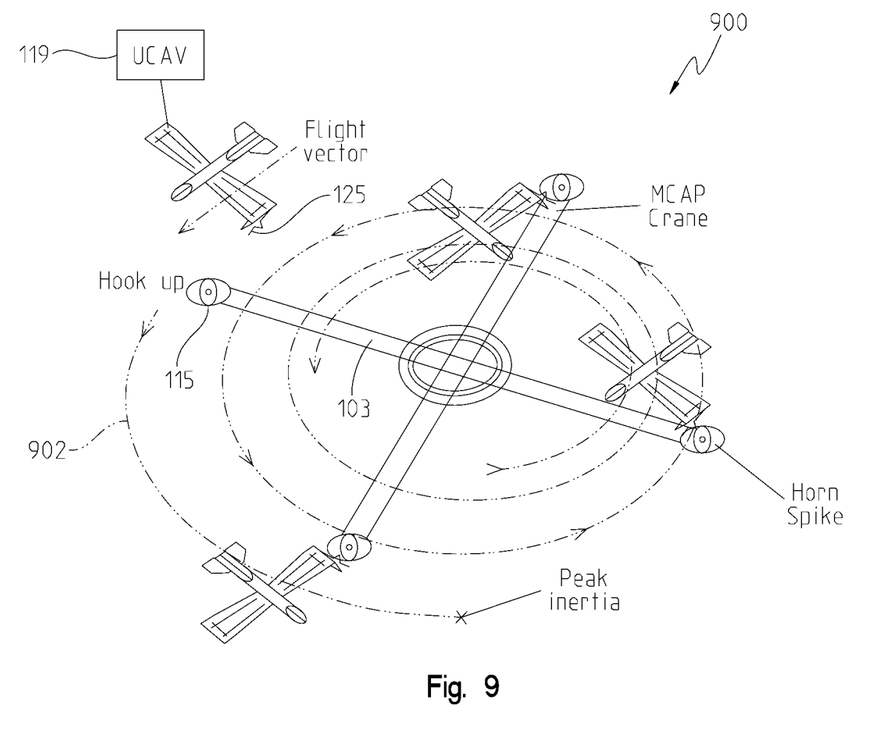
FIG. 9 shows a diagram of a UAV arrestment process according to an illustrative embodiment of the invention.

Referring to FIG. 9, a diagram of a UAV arrestment process 900 according to an illustrative embodiment of the invention is shown. The UAV arrestment process includes a UAV 119 with an arrestment hook 125 on its wing and a pivoting crane 103 with an arrestment receiver 115 attached to its end. The arrestment receiver is mounted on a pivoting system so it may rotate around the end of the crane 103.

In operation, the UAV 119 with an arrestment hook 125 on its wing maintains a flight path such that the arrestment hook 125 attaches to a rod on the arrestment receiver 115. The crane 103 rotates one quarter of a turn 902. At this point, the UAV 119 has reached its peak inertia as the arrestment receiver 115 and the UAV 119 rotate around the end of the crane. As the UAV 119 rotates around the end of the crane, braking pressure is applied to the pivot point of the arrestment receiver 115 to slow the rotation of the UAV 119, which continues to rotate until it eventually comes to rest.

Although the invention has been described in detail with reference to certain preferred embodiments, variations and modifications exist within the spirit and scope of the invention as described and defined in the following claims.

The invention claimed is:

1. A system for arresting an unmanned aerial vehicle (UAV), said system comprising:
a crane comprising a crane base, a lower crane section, an upper crane section, a first actuator coupled between said base and said lower crane section operable for selectively adjusting positions of said lower crane section, a second actuator coupled between said lower crane section and said upper crane section operable for selectively adjusting positions of said upper crane section, a first gyro coupled with a section of said lower crane section configured to apply a force to said lower crane section to counter rotational inertial forces during arrestment of said UAV, a second gyro coupled with a section of said upper crane section configured to apply a force to said upper crane section to counter rotational inertial forces during arrestment of said UAV, an arrestment receiver coupled with said upper crane section, said arrestment receiver adapted to rotate around a rotational axis when said UAV couples with said arrestment receiver, said rotational axis passes through an attachment point with said upper crane section that is perpendicular to a flight path of said UAV at it approaches said arrestment receiver, said arrestment receiver further comprising a tilt control operable to orient said arrestment receiver relative to said UAV and a coupling structure configured to engage with a retractable hook section of a wing of said UAV;
wherein said crane rotates around a pivot point at the crane base during said arrestment of said UAV;
wherein said arrestment receiver further comprises a mechanism operable to counter force applied to said crane during said arrestment of said UAV.

2. The system of claim 1, wherein said UAV further includes a first alignment system, wherein said first alignment system includes a first infrared camera, a first optical emitter, and a first optical quadrant receiver.

3. The system of claim 2, wherein said arrestment receiver further includes a second alignment system, wherein said second alignment system includes a second infrared camera, a second optical emitter, and a second optical quadrant receiver, wherein said first and second alignment system are configured to coordinate between said first and second alignment systems and send control signals operable to control, position, and rotate the arrestment receiver around said rotational axis so said arrestment receiver is oriented to engage with said UAV, said first and second alignment systems are further configured to collectively generate additional control signals to provide additional control inputs to at least one of said first and second gyros.

4. The system of claim 3, wherein said arrestment system includes a first servo motor that rotates said arrestment receiver and said tilt control further comprises a second servo motor that tilts said arrestment receiver.

5. The system of claim 1, wherein said crane is mounted on a boat or ship.

6. The system of claim 1, wherein said arrestment system further comprises a laser receiver adapted to receive signals from a laser system on said UAV, said UAV is configured to adjust said flight path to align with a target section of said arrestment system so as to guide said UAV along said flight path to engage with said arrestment system.

7. A UAV arrestment process comprising:
providing a pivoting crane with a first control and sensor section configured to detect orientation, speed, and position of a second control and sensor section positioned on a portion of said UAV as said UAV approaches said pivoting crane as well as a rotational arrestment receiver and brake assembly attached to a distal end section of said pivoting crane coupled with said rotational arrestment receiver and brake assembly, the rotational arrestment receiver and brake assembly is mounted on a pivoting system so said arrestment receiver and brake assembly is configured to rotate around an axis oriented through said distal end section of said crane that is perpendicular with a direction of flight of said UAV when said rotational arrestment receiver and brake assembly engages with an arrestment hook of said UAV in a recovery mode of operation;

positioning the pivoting crane, said control and sensor assembly, and said first control and sensor section as well as said rotational arrestment receiver and brake assembly so as to align a flight path of said UAV associated with a portion of said rotational arrestment receiver and brake assembly with said arrestment hook of said UAV as said UAV approaches said arrestment receiver and brake assembly;

operating said UAV comprising said arrestment hook on a section of said UAV wing so as the UAV maintains a flight path such that the arrestment hook attaches to a section on the arrestment receiver and brake assembly based upon said second control and sensor section detecting a position of said first control and sensor section and controlling said UAV along a flight path parallel to a plane that said sensors from said first and second control and sensor sections align within; and rotating the crane and the arrestment receiver and brake assembly so as the UAV rotates around said distal end of the crane, wherein as the UAV rotates around the end of the crane, said arrestment receiver and braking assembly applying braking pressure to a pivot point of the arrestment receiver and brake assembly to slow rotation of the UAV which continues to rotate until said UAV eventually comes to rest.

* * * * *